(12) United States Patent
Brockhaus et al.

(10) Patent No.: US 10,082,780 B2
(45) Date of Patent: Sep. 25, 2018

(54) METHOD FOR PARAMETERIZATION OF A FIELD DEVICE AND CORRESPONDING FIELD DEVICE

(71) Applicant: KROHNE Messtechnik GmbH, Duisburg (DE)

(72) Inventors: Helmut Brockhaus, Oberhausen (DE); Johannes Kunze, Bochum (DE); Ralf Storm, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 474 days.

(21) Appl. No.: 14/454,989

(22) Filed: Aug. 8, 2014

(65) Prior Publication Data

US 2015/0045913 A1 Feb. 12, 2015

(30) Foreign Application Priority Data

Aug. 8, 2013 (DE) .......................... 10 2013 013 155

(51) Int. Cl.
| | |
|---|---|
| *G05B 13/02* | (2006.01) |
| *G05B 19/042* | (2006.01) |
| *G05B 15/02* | (2006.01) |
| *G05B 19/05* | (2006.01) |

(52) U.S. Cl.
CPC ......... *G05B 19/0425* (2013.01); *G05B 15/02* (2013.01); *G05B 19/058* (2013.01)

(58) Field of Classification Search
CPC ................ G06K 19/0719; G06F 21/64; G05B 19/4185; G05B 23/0272; G05B 19/0426; G05B 9/02; G05B 19/0425; G05B 19/058; H04L 5/003; G01R 19/2513
See application file for complete search history.

(56) References Cited

U.S. PATENT DOCUMENTS

| | | | |
|---|---|---|---|
| 7,912,990 B2 | 3/2011 | Schlette | |
| 8,316,356 B2 | 11/2012 | Frey | |
| 8,634,938 B2 | 1/2014 | Lomas | |
| 8,792,926 B2 | 7/2014 | Isozu et al. | |
| 9,384,440 B2* | 7/2016 | Stern | ................... G06K 19/0719 |
| 2005/0097194 A1* | 5/2005 | Eisenbeis | ........... G05B 19/0426 709/221 |

(Continued)

FOREIGN PATENT DOCUMENTS

| | | |
|---|---|---|
| DE | 103 29 407 B4 | 6/2007 |
| DE | 10 2011 088 236 A1 | 6/2013 |

OTHER PUBLICATIONS

McKay et al, "Industrial Data Networks": Design, Installation and Troubleshooting; copyright 2004, 220 pgs <Indus_Data_NWs.pdf>.*

*Primary Examiner* — Tuan A Vu

(74) *Attorney, Agent, or Firm* — David S. Safran

(57) ABSTRACT

A field device and a method for parameterization of a field device are disclosed. The method includes transmitting a parameter value to the field device from a parameterization unit. The method also includes generating a feedback character string from the received parameter value by the field device and the transmitting feedback character string to the parameterization unit. The method further includes outputting the received feedback character string by the parameterization unit so that it is understandable for the user.

15 Claims, 3 Drawing Sheets

(56) References Cited

U.S. PATENT DOCUMENTS

| | | | | |
|---|---|---|---|---|
| 2006/0010501 | A1* | 1/2006 | Borrowman | G06F 21/64 726/27 |
| 2006/0101111 | A1* | 5/2006 | Bouse | H04L 12/40 709/200 |
| 2008/0288191 | A1* | 11/2008 | Jurisch | G01R 19/2513 702/60 |
| 2010/0323708 | A1* | 12/2010 | Kozat | H04L 5/003 455/450 |
| 2012/0062577 | A1* | 3/2012 | Nixon | G05B 23/0272 345/522 |
| 2013/0261772 | A1* | 10/2013 | Keutner | G05B 9/02 700/79 |
| 2013/0289747 | A1* | 10/2013 | Panther | G05B 19/4185 700/52 |

* cited by examiner

METHOD FOR PARAMETERIZATION OF A FIELD DEVICE AND CORRESPONDING FIELD DEVICE

BACKGROUND OF THE INVENTION

Field of the Invention

The invention relates to a method for parameterization of a field device. At least one parameter value is transmitted to the field device from at least one parameterization unit. At least one parameter value is received by the field device. At least one feedback character string is generated from the at least one received parameter value by the field device. The feedback character string is transmitted to the parameterization unit by the field device. The received feedback character string is output by the parameterization unit so that it is understandable for the user and, in particular, is visually displayed. Furthermore, the invention relates to a field device having at least one interface for connection to a parameterization unit, at least one control component, and at least one data storage device. The control component generates at least one feedback character string from at least one parameter value received by the field device.

Description of Related Art

In modern process automation, such as in processing plants, field devices are used for monitoring process variables (e.g., fill level, flow, temperature, pH, etc.) and actuators for influencing the processes or process variables. The communication between the field devices and, for example, a control room occurs using fieldbuses, wherein different data protocols (e.g., HART, PROFIBUS PA, 4 . . . 20 mA, etc.) can be used for the transmission of measuring or control data.

Additionally, it is also provided, in part, that the field devices have their own display units (i.e., "displays"—that can be used to present, for example, measuring data or further values of the field device. It is possible to directly influence the field device via a display and, optionally, in conjunction with a type of keypad on the field device itself, or via a corresponding interface on the field device and an operator unit in order to, for example, start programs, enter or choose parameters.

Thus, many field devices have at least two output possibilities: an interface for the connection of the field device to a fieldbus for data connection; and a display unit for on-site presentation. Additionally, there is optionally the aforementioned input unit, for example, in the form of a keypad or some knobs on the field device; or the service interface for connecting an external unit, such as a so-called "handheld," or a portable computer in the form of a laptop.

It is problematic when the data connection itself is not secure and when, at the same time, the use of the field device is security-sensitive. If, above all, the field device is parameterized, how it should function and at which calculation values, limitation values and control values it should function is set, so that it is of great importance that the parameter values are safely and reliably set in the field device.

Where necessary, guidelines are also relevant in the respective security requirements in order to fulfill important SIL ("safety integrity level") standards in process automation.

Not only data communication between a parameterization unit and the field device can be unsafe and thus critical in this situation, but also individual components or elements of the field device can be unsafe.

A similar method for parameterization of a field device is described in European Patent EP 2341406 B1 (which corresponds to U.S. Pat. No. 8,634,938 B2). A parameter value is transmitted from a parameterization unit to a field device and stored read-only. The field device transmits the received parameter value back to the parameterization unit, namely in a format that cannot be processed by the parameterization unit. This, in particular, is a text format, so that the parameter value is fed back as a character string. Additionally, the name of the parameter and a confirmation code are transmitted. The confirmation code is, in turn, sent back to the field device after a comparison of the re-transmitted parameter value with the supplied parameter value.

International Patent Application WO 2006/053668 A2 (which corresponds to U.S. Pat. No. 7,912,990 B2) describes a method for parameterization of a device, wherein the parameter values are fed back from the device to the parameterization unit at least once for monitoring.

For sending parameter values from a parameterization unit to a field device, it is proposed in German Patent DE 10329407 B4 to send them as a character string using the HART protocol.

To ensure that all parameters are unchanged after a re-boot of a field device, it is suggested in German Patent Application DE 102011088236 A1 to determine from the parameter values a checksum at a first time and a further checksum after re-booting and to compare the checksums to one another.

The implementation of parameterization of a field device according to German Patent Application DE 102010062908 B4 (which corresponds to U.S. Patent Application Publication 2013/0261772 A1) is similar, in which it is provided that a checksum is generated and displayed for the parameter values by each the field device and the parameterization unit and that a user compares the checksums to one another.

In parameterization of field devices, consideration must be made in regard to the used components and transmission paths, insofar as errors can sneak in therefrom. Thus, one goal is to avoid, as much as possible, that defective or unsafe and thus possibly error-prone components or unfortunate chains of errors lead to the safety of the parameterization being jeopardized.

Simultaneously, it should be possible to carry out parameterization even in unfavorable conditions. For example, in the case that the field device cannot be directly or easily reached, so that, for example, a display on the field device is rarely or not always of assistance. Parameterization should, thus, always be optimized in consideration of practicability.

In particular, it should be additionally ensured that the field device is integrated in the process of parameterization or in the process of confirmation of the parameter value and that e.g., the parameterization unit does not just copy data. The reason for this is that the parameterization unit, depending on the design, takes over two roles: input of the parameter value and feedback of the parameter value. Thus, it must be guaranteed that the parameter value is really transmitted to the field device and is sent back from there.

One step in that direction is, inter alia, the use of character strings or text data, which cannot be understood or used by the involved devices (parameterization unit or field device) or by their components. Thus, the possibility of influencing the flow of information is limited or such influence is more easily recognizable.

SUMMARY OF THE INVENTION

Thus, the object of the invention is to provide a method for parameterization of a field device, and a corresponding field device, which allows for the secure transmission of parameter values via a possibly unsafe data connection and possibly unsafe components.

The method according to the invention, in which the derived object described above is met, is initially and essentially characterized in that the feedback character string is generated by the field device in such a manner that the parameter value received by the field device is converted into a character string and that at least one character—in particular understandable for the user and predeterminable or set solely by the field device—is inserted in the character string of the received parameter value at at least one position—in particular predeterminable or set solely by the field device.

In the method according to the invention, the field device generates a character string—in particular only using ASCII characters—from the respective parameter value that it receives from the parameterization unit and inserts at least one additional character (if possible, also a ASCII character) in this character string as an interfering character at at least one position. The inserted character is located, here, in particular within the characters of the respective parameter value, so that, for example, in a visual presentation, the parameter value appears disrupted or interrupted.

The field device thus generates an interrupted character string, which is then transmitted back to the parameterization unit. There, the interrupted character string is presented in a manner that is understandable by the user—i.e., a person who is carrying out the parameterization—and, in particular, is correspondingly visually displayed.

For comparison, preferably the entered parameter value and the parameter value transmitted to the field device and the received feedback character string are each presented on the parameterization unit, so that the user can carry out the comparison.

Thereby, the parameter values are entered into the parameterization unit in the form of a character string and chosen from a list in another (i.e., alternative or additional) form.

In one design, the entered parameter value and the feedback character string in text format (i.e., as character string) are output on the parameterization unit so that they are understandable for the user and, in particular, are visually displayed.

Since the character string of the parameter value entered into the parameterization unit and the feedback character string received there differ from one another in the at least one (interfering) character, the circumstance is eliminated in which the parameter value is only presented twice by the parameterization unit. Thereby, in particular, how the feedback character string is generated or how and where which character(s) in the character string of the parameter value is or are inserted is not stored in the parameterization unit. Thus, the parameterization unit cannot generate supposed feedback character strings itself.

The inserted character is, in particular in one design, chosen from the group of characters that can be presented using a display.

In one design, the field device varies the position, the type and the number of inserted (interfering) characters. The pattern of the variation or the insertion of the character or characters is provided in one design so that, in particular, a user can deduce more information from the feedback character string via the field device. In an alternative design, the field device varies the input of the character or characters itself and, in particular, randomly.

If more than one parameter value is entered, then it is provided in one design that all of these parameter values must always be entered in parameterization. Thereby, the input of the parameter values occurs, in particular, in a fixed order.

In one design, the parameter to be entered is agreed upon in a dialog between parameterization unit and field device at the beginning of parameterization and, possibly also the order for input is determined.

The field device is, in particular, an actuator or a measuring device. The parameterization unit is, for example, a control room, a (preferably portable) computer (laptop) or a handheld device as mobile control panel for field devices or a PDA.

In one design, only telegrams limited in their data amount are available for communication between the parameterization unit and the field device, so that, in one design, the feedback character strings are free of names or other designations of each parameter affected by the parameter value.

In one design, at least one identifier assigned to the field device (i.e., a device ID) is transmitted from the field device—in particular as part of a feedback character string—to the parameterization unit. In this manner, the user obtains information at the parameterization unit about which field device the parameter values are reaching. This is possibly relevant in the case that devices can be exchanged or that data links can be changed in a process plant.

In one design, the feedback character string is generated by the field device in such a manner that the feedback character chain has a physical unit (e.g., volt, ampere, second or without a unit for pH) associated with the received parameter value. In this design, together with the feedback character string, the field device also transmits the physical unit of the parameter, whose value is to be set by the parameter value. Hereby, how the parameter value is understood by the field device and for what the parameter value is used is implicitly indicated by the field device. The structure of the feedback character string is thus partially so in this design, that a character string of the parameter value—having at least one character inserted therein and actually interfering—follows the associated physical unit—also as a sequence of characters. By comparing the physical unit, the user can also determine if he has entered the correct parameter value or if the parameter value is correctly understood by the field device, i.e., the correct parameter has been assigned.

In one design, N parameter values are transmitted from the parameterization unit to the field device. Thereby, N is an integer greater or equal to 2. The parameter values to be entered belong, if applicable, to the parameters that have been set by the user of the field device and are correspondingly activated. Alternatively, these are parameters that have been set, in particular, during manufacture by the producer of the field device.

Accordingly, N parameter values are received by the field device—in the above-described manner—and a feedback character string is generated from respectively at least one of the overall N received parameter values. The field device thus generates in total at least N feedback character strings, which each arise from one of the N received parameter values and contain the respective parameter value in conjunction with the at least one inserted character.

The N feedback character strings are transmitted from the field device to the parameterization unit, wherein, in one design, the generation of the respective feedback character string and its transmission to the parameterization unit directly follow the receipt of a parameter value, so that each parameter value essentially directly and immediately undergoes confirmation by means of feedback to the parameterization unit.

If the N feedback character strings have been transmitted to the parameterization unit, i.e., the transmission of a parameter value, the generation and transmission of the respective feedback character string have occurred N times, then the field device subsequently transmits a control code to the parameterization unit.

The field device, in one design, knows the number N of the parameter values, since this number N is fixed or stipulated, so that respectively N parameter values must always be entered. Alternatively, a corresponding information signal is awaited by the parameterization unit; for example, a certain character or a pause exceeding a particular predefined threshold value after transmission of a parameter value.

It is provided in one design that at least one confirmation code from the parameterization unit is received by the field device after transmission of the control code to the parameterization unit. In particular, the confirmation code is thereby entered by a user via the parameterization unit. The field device then generates a comparison result based on a comparison of the control code and received confirmation code. Depending on the comparison result, the field device activates the N received parameter values for an operation of the field device. In particular, activation in this context means that the field device enables the parameter values so that they can be used by the corresponding components or units of the field device for operating the field device.

In one design, the parameterization unit presents the received control code so that it is understandable for the user—i.e., in particular, is visually displayed. As a result, the user enters the shown control code into the parameterization unit as confirmation code, which is then transmitted back to the field device.

In one design, thus, the control code consists only of alphanumeric characters—possibly enhanced by selected special characters (e.g., period, comma, semicolon, dash, etc.), in order to enable input even using a correspondingly simple keypad of a parameterization unit. The user enters the shown control code into the parameterization unit and thus confirms the receipt of the control code. A character string is also generated from the input by the user and transmitted to the field device as confirmation code.

Then, the field device compares the sent control code with the received confirmation code and generates a comparison result.

In a further design, the control code only has a certain temporal validity, so that the user has to enter the confirmation code in a certain predetermined amount of time and the parameterization unit has to transmit it to the field device.

If, for example, the control code and confirmation code is a character string and if both have identical content, then the field device preferably activates the parameter value, so that the field device or its components with the parameter values carry out their duties and e.g., measure process variables or influence such.

In one design, at least one additional—disrupting, in the sense of the above designs—character, which is not to be entered or taken into consideration during input into the parameterization unit or during comparison in the field device, is found in each of the transmitted control and/or confirmation codes.

By entering the confirmation code, in one design, the user terminates the actual parameterization process in the narrow sense and at least in respect to his actions or his input of parameter values.

In one design, the control code is generated by the field device based on at least one random number. In one design, the control code is, in particular, independent of the received parameter values, so that, in particular, no information in respect to a specific value is transmitted via the control code.

In one design, a control component is provided at least for generating the control code, which is designed according to a higher safety standard than at least one other component—e.g., a data storage device or an interface—of the field device.

In one design, the feedback character strings are also generated by the control components and transmitted to the parameterization unit or, additionally or alternatively, at least the control unit receives the parameter values and correspondingly carries out the steps of the method according to the invention for parameterization on the side of the field device.

In that the control unit fulfills a higher safety standard and thus is also a safe component, the essential steps of the method for parameterization can be assigned to it.

In one design, the use and safeguarding of the parameter values in the field device follows their input. This is described in detail in the following description of embodiments.

It is provided in one design, that the at least one received parameter value is stored by the field device in at least one data storage device and that at least one initial test value is generated by the field device based on at least the at least one received parameter value.

Storage already takes place, in one design, during the method steps with the input of the following parameter values. If several initial test values are generated via subgroups of the parameter values, then these are generated or calculated during the running parameterization process in an additional design.

If N parameter values are transmitted, then the initial test value is generated using all N parameter values in one design.

In an alternative design, the parameter values are gathered into groups and group-specific initial test values are generated using each of the individual groups.

The test value is, for example, a checksum or a CRC ("cyclic redundancy check").

The generated control code and/or the received confirmation code are included in the generation of the initial test value or the initial test values in one design. Since, in one design, the control code is, in particular, especially generated for the current parameterization, it can be ensured by using the control code in generating the initial test value that the last stored set of parameter values or the last stored parameter value is also really the current value.

In one design, a so-called "warm start" of the field device is carried out after the input of the parameter value, after which the, in accordance with the above-described manner, newly entered parameter values are introduced to or entered in the corresponding components of the field device or the corresponding locations in the field device.

It is thereby provided in one design that at least one stored parameter value from the data storage device is supplied to at least one sub-component of the field device (e.g., a microprocessor or a control unit, etc.) after storing at least one received parameter value; and, in particular, also after generating the initial test value. Thereby, these are, in particular, subcomponents for which each of the parameter values is determined.

After the warm start, the components receive their parameter values required for interaction and for correct and possibly process-specific functioning.

In a supplementary design, the parameter values received and correspondingly stored by the field device following parameterization are appropriately distributed in the field device. Subsequently, a current test value is generated by the field device and, in particular, by the safe control component—based on the parameter values obtained from the data storage device.

In one design, the parameter values are retrieved and compiled by the individual components. In another design, the parameter values are directly accessed in the data storage device.

In one design, the generated control code and/or the received confirmation code are included in the generation of the current test value.

In one design, initial test value and current test value are determined using all parameter values of the field device.

In an alternative design, both above-mentioned test values are generated only using the parameter values that can be entered by a user, e.g., by a person instructed by the operator of the field device using the above-described method.

Subsequently, a comparison between the initial test value and the current test value takes place with the generation of a comparison result.

By comparing the initial and current test values, it can be ensured that each of the input parameter values is used in the individual components.

If respectively the control or confirmation code, which is known only by the safe component that performs the comparison of the test values, is included in generating the test value, it is prevented that a copy of old parameter values is used.

If the initial test value and the current test value differ from one another, then at least the safe components, which perform the comparison of the test values, switch over to a safe error state in one design. In one design, an error message is additionally or alternatively generated.

In one design, a switching of the field device between a safety-oriented (e.g., SIL) state and a non-SIL state is implemented like the input of a parameter value, so that, for this switching, possibly only one parameter value is transmitted and returned. A validation code is transmitted as parameter value in one design, which is required for the switching between the two modes.

The derived and described object is met with the field device described in the introduction according to a further teaching of the invention in that the control components generate the feedback character string in such a manner that the parameter values received by the field device are converted into a character string and that at least one character—in particular understandable for the user and predeterminable or set solely by the field device—is inserted in the character string of the received parameter value at at least one position—in particular predeterminable or set solely by the field device. In particular, the steps of the method described above are carried out in the field device.

In one design, the field device and the parameterization unit are integrally formed. Thus, the field device is not parameterized using an additional device such as a separate parameterization unit, rather the field device is, in particular, directly parameterized using a corresponding input unit. The method for parameterization is used, thus, for safety in respect to subcomponents of the field device that are possibly joined to one another via an internal bus.

In detail there are a number of possibilities for designing and further developing the method according to the invention and the field device according to the invention. Reference is made, on the one hand, to the patent claims subordinate to patent claim 1 and patent claim 9 and, on the other hand, to the following description of embodiments in conjunction with the drawing. The drawing shows

DETAILED DESCRIPTION OF THE INVENTION

Figure 1:
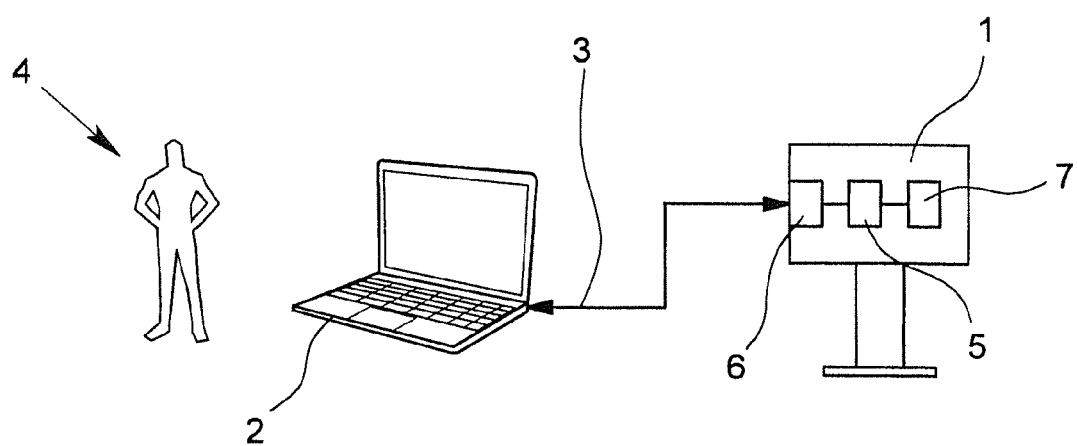
FIG. 1 a schematic representation of a parameterization of a field device.

The parameterization of a field device 1, which is a flowmeter in this case, using a parameterization unit 2 is shown schematically in FIG. 1. A cable-connected data link 3 is provided between the field device 1 and the parameterization unit 2 here, which is, in particular, designed to be bidirectional. In an alternative embodiment—not shown here—a radio link exists between the field device 1 and the parameterization unit 2.

The connection between the field device 1 and the parameterization unit 2 can, for example, be only temporary for the input of the parameter. For this, the shown parameterization unit 2 in the form of a laptop is suitable. However, the connection can be a continuous one—not shown here—as exists using a fieldbus, to which the field device is permanently attached.

If the parameterization unit is a hand-held device (i.e., a so-called "handheld") or a service laptop, then the data link 3 is only generated for the duration of parameterization. The parameterization unit 2 is, in the shown embodiment, a self-contained unit independent of the field device 1.

The user 4 enters parameter values via the parameterization unit 2, which are transmitted to the field device 1 via the data link 3. The steps of parameterization on the side of the field device 1 are carried out by a control component 5 designed according to a respective safety standard.

The control component 5 receives a parameter value each via the interface 6 and generates a feedback character string from it. The type and length of the feedback character string is dependent upon what type of interface 6 is used for returning the feedback character string and which type of protocol is used. Thus, there is possibly a limit to the number of characters that are to be sent in a so-called "telegram."

The received parameter value results from the electric signals received via the data link 3 and belonging to a protocol (e.g., HART) used for data communication. In one embodiment, the communication signals directly carry a character string as parameter value or they carry the respective parameter value in another format.

The feedback character string—i.e., a string that, considered by itself, cannot be directly understood or used by the components and devices involved, but rather has to be initially respectively interpreted—is generated from the received parameter value. The parameter value is converted into a character string thereby.

This step is, in particular, especially simple when the parameter value is already sent as a character string by the parameterization unit and is also received by the field device as such. In this character string, at least one additional and thus interrupting character is inserted at at least one position.

Additionally, the physical unit of the parameter value is included. If, for example, a voltage is input, then the interrupted character string follows the letter V.

Overall, the feedback character string is a sequence of—in particular, visually representable—characters that have an interrupted parameter value and represent the associated physical unit.

In one embodiment, at least one feedback character string contains an identifier as ID assigned to the field device 1 and clearly identifying it.

For a direct connection, this feature can also be shut off, since it is clear to which field device 1 the parameterization unit 2 is connected.

Such an ID, however, in particular, is relevant when there is a larger distance and/or several field devices are arranged between the parameterization unit 2 and the field device 1. This is true, in particular, in the case that the parameterization unit 2 and the field device 1 are connected to one another within a process plant via a fieldbus.

The control component 5 sends the feedback character string back to the parameterization unit 2 via the interface 6, where it can be understood by the user 4, i.e., particularly is visually displayed.

This process is repeated N times for N parameter values to be entered, i.e., at least twice.

In order to simplify communication, the parameter values are, thereby, each entered in a predetermined order.

If all parameter values are transmitted and returned, then the control component sends a control code to the parameterization unit 2. This control code is generated, thereby, in particular, dependent on a random number and, in the shown exemplary embodiment, in particular, independent of the value of the transmitted parameter value. The control code is thus specifically assigned to each input of the parameter value and also allows for an identification of the parameterization process with it.

The control code is also shown using the parameterization unit 2 in order to be entered by the user 4 and transmitted as confirmation code to the field device 1 and, in particular, in the case that the feedback character string shows that the parameterization is running correctly.

The control code and the confirmation code are compared to one another in the control component 5. The comparison result resulting therefrom leads, in the positive case of agreement, to the parameter values being activated or enabled for use in the field device 1.

Activation thus occurs in the shown embodiment of the field device 1 in that the parameter value is stored in a data storage device 7 by the control component. Additionally, the control component 5 generates at least one initial test value via the parameter value and via the control code, which is also stored in the data storage device 7.

Thereafter, a so-called "warm start" is activated, in consequence of which the individual components or units of the field device 1 obtain their parameter values from the data storage device 7 for operation. In data storage device 7, thereby, in particular, further parameter values are stored that are not accessible to a normal user 4 and thus cannot be changed by the user.

A current test value is generated from the parameter values assigned to the components and the control code, which is, in particular, specifically stored in the control component 5, and is compared with the initial test value stored in the data storage device 7. Thereby, each associated initial test value is compared with the appropriate current test value for the groups of parameters.

If the comparison result shows a match, then the field device 1 can perform its functions and, here, for example, can determine the flow of a medium. If the comparison result shows a deviation, then it is obvious that an error has occurred and the control component 5 switches over to a safe error state, which leads to the field device 1 switching to an error state.

An error can occur, for example, in that a value in the data storage device 7 is incorrectly stored, changed there or erroneously retrieved, in that a parameter value does not correctly arrive at a component of the field device 1 or in that an old parameter set is accidentally entered during the warm start in the data storage device 7. This old parameter set, however, has an initial test value that was generated by an old control code.

Figure 2:
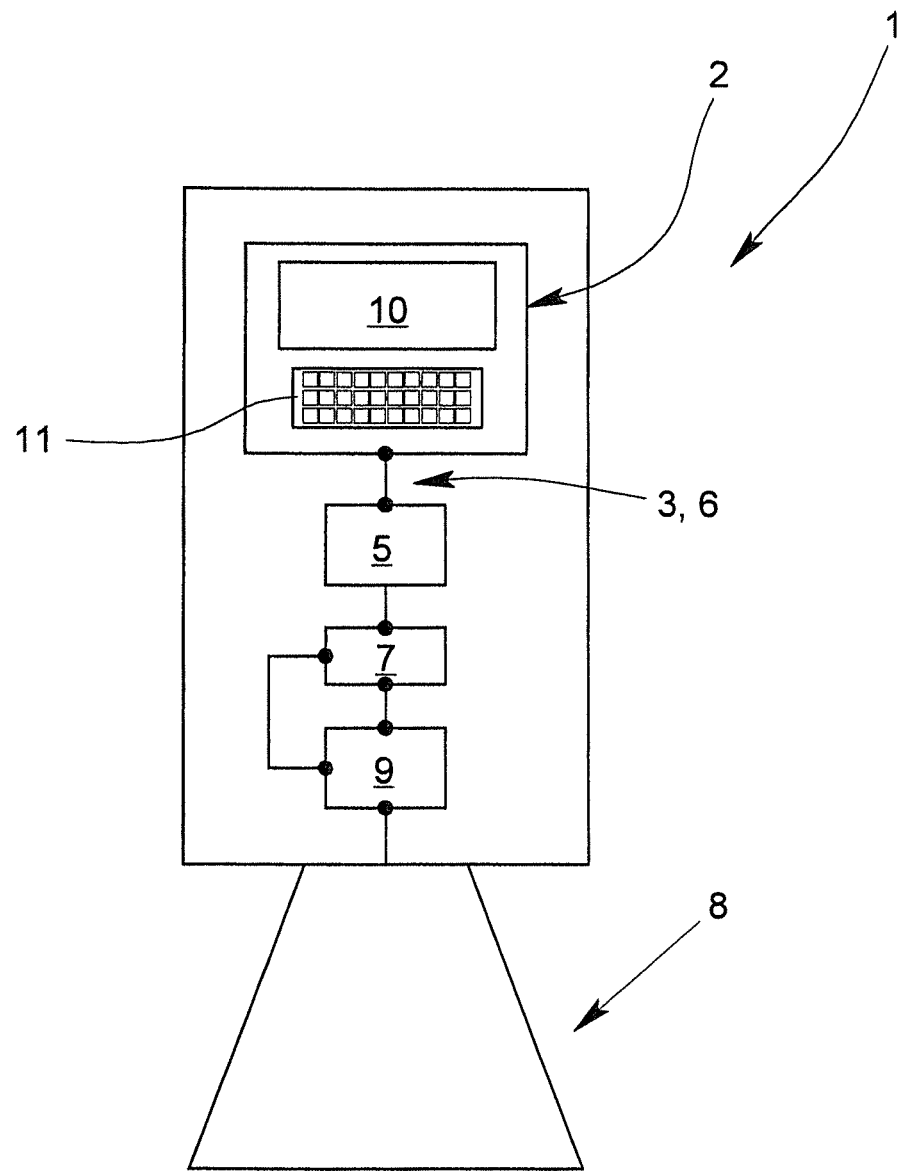
FIG. 2 a schematic representation of a field device.

Whereas FIG. 1 shows a field device 1 that is connected to a separate parameterization unit 2, FIG. 2 shows a field device 1 that is designed in such a manner that parameter values can be directly entered at the field device 1.

The field device 1 of FIG. 2 has an antenna 8, via which fill level measurement using the radar principle can be implemented. An electronics unit 9 is provided for the generation of microwaves to be emitted and the evaluation of the received microwaves.

The field device 1 has a display 10 and a keypad 11, both of which being considered as parameterization unit 2 in total. Thus, the internal data link 3 between this parameterization unit 2 and the control component 5 is understood as an interface 6, via which the field device 1 finally receives the parameter values from the parameterization unit 2.

Since it is clear from the integral arrangement of parameterization unit 2 and field device 1, it is, in particular, not provided that the control component 5 adds an identifier for the filed device 1 in the feedback character string—or in at least one feedback character string.

In the field device 1 of the embodiment in FIG. 2, safety monitoring of the parameterization refers to the data communication within the field device 1 or only the components of the field device 1 itself.

In this example of the field device 1, in particular, the process of the warm start after input of the parameter values is made clear.

Thus, it is assumed that the control component 5 has determined that the control code and the confirmation code are identical and that the parameter values and the initial test values generated for the individual groups of parameter values dependent on the control code are stored in the data storage device 7.

After the warm start of the field device 1, the individual components obtain their parameter values from the data storage device 7. This holds true, here, in particular for the electronics unit 9, to which reference values are assigned as parameter values.

The control component 5 then taps the parameter values from the electronics unit 9 and possible further—not shown here—components and, from this, determines the current test value with the control code known to it.

Then, the control component 5 compares the current test value with the initial test value stored in the data storage device 7 and generates a comparison result. A match leads to the field device 1 carrying out measurement. In the case of deviation, the control component 5 switches the field device 1 into a safe error state.

Figure 3:
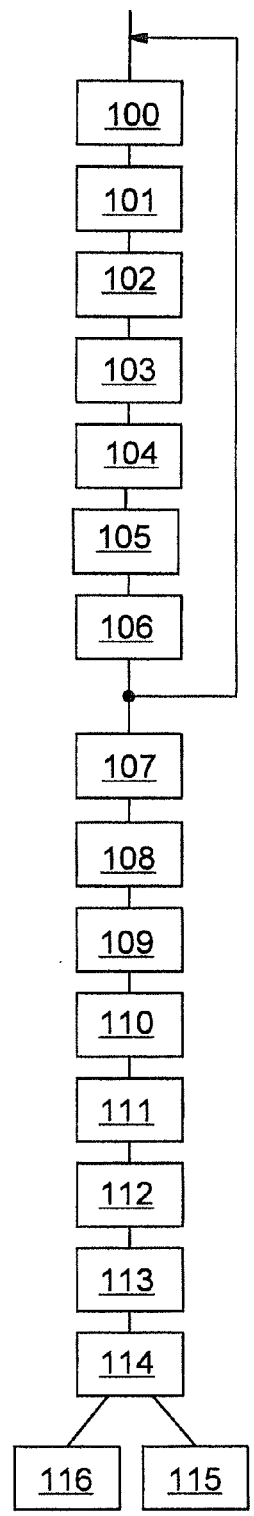
FIG. 3 a schematic course of individual steps during parameterization of a field device.

An exemplary course of parameterization is shown in FIG. 3.

In step 100, a parameter value is entered via a parameterization unit. This parameter value is transmitted to the field device in step 101 and received there in step 102. In step 103, a feedback character string is generated based on the received parameter value, the feedback character string being communicated to the parameterization unit in step 104, received there in step 105 and represented in a manner understandable for the user in step 106, so that the user can compare the entered parameter value and the feedback character string.

This process occurs N times. Thereby, the parameter values are, in particular, to be entered in a specific, predetermined order. In one embodiment, the input can also be interrupted or terminated by an action of the user.

If the field device has received all N parameter values and has quasi acknowledged the N feedback character strings, then the field device generates the control code in step 107, which is transmitted to the parameterization unit in step 108, received there in step 109 and displayed in a manner understandable for the user in step 110.

In step 111, the user enters the confirmation code, which is transmitted to the field device in step 112 and received there in step 113.

The field device generates a comparison result based on the control code and the confirmation code in step 114, which gives information about whether both codes are identical or if they differ.

If the control code and the confirmation code are the same, then the user has, thus, in particular, confirmed that the feedback character string correctly reflects the entered parameter values. Thus, the field device activates the parameter values in step 115, so that they can be used after a warm start of the field device.

If the control code and the confirmation code differ, then the field device switches to a safe error state in step 116.

What is claimed is:

1. A method for parameterization of a field device, comprising:
    transmitting, by a parameterization unit, at least one parameter value to the field device as a data type other than a character string;
    generating, by the field device, a feedback character string using the at least one parameter value;
    transmitting, by the field device, the feedback character string to the parameterization unit; and
    outputting, by the parameterization unit, a visual display of the received feedback character string,
    wherein generating the feedback character string comprises:
    converting the parameter value received by the field device as a data type other than a character string into a character string; and
    inserting at least one additional and arbitrary character in the character string as an interfering character at at least one position thereby providing secure transmission of parameter values even if a data connection and components used are unsafe.

2. The method of claim 1, wherein the at least one additional character which is inserted into the character string is predetermined by a user.

3. The method of claim 1, wherein the at least one additional character which is inserted into the character string is determined solely by the field device.

4. The method of claim 1, wherein the at least one additional character is inserted into the character string at a predetermined position.

5. The method of claim 1, wherein the at least one additional character is inserted at a position determined solely by the field device.

6. The method according to claim 1, wherein the feedback character string has a physical unit of measurement associated with the at least one parameter value.

7. The method of claim 1, wherein:
    the transmitting the at least one parameter value by the parameterization unit comprises transmitting N parameter values to the field device;
    the generating the feedback character string by the field device comprises generating the feedback character string respectively from at least one of the N parameter values for each of the N parameter values; and
    the method further comprises transmitting by the field device, to the parameterization unit, a control code to the parameterization unit after the N feedback character strings have been transmitted to the parameterization unit by the field device, wherein N is an integer greater than or equal to 2.

8. The method of claim 7, wherein the associated feedback character string is transmitted to the parameterization unit by the field device after receiving each of the N parameter values.

9. The method of claim 7, further comprising:
    transmission of a confirmation code from the parameterization unit to the field device after the field device transmits the control code to the parameterization unit,
    generating, by the field device, a comparison result by comparing the control code and the received confirmation code; and
    depending on the comparison result, activating by the field device the N received parameter values for an operation of the field device.

10. The method according to claim 9, further comprising:
    storing the at least one parameter value received by the field device in at least one data storage device; and
    generating by the field device at least one initial test value at least based on the at least one received parameter value.

11. The method of claim 10, wherein the generating of at least one initial test value by the field device is additionally based on the control code and/or the confirmation code.

12. The method according to claim 10, wherein after storing the at least one received parameter value, the method further comprises:
    supplying at least one subcomponent of the field a received parameter value from the data storage device;
    generating, by the field device, at least a current test value from the parameter value supplied to the subcomponent; and
    generating a comparison result from a comparison between the initial test value and the current test value.

13. The method of claim 12, wherein the current test value is generated from the control code and/or the confirmation code.

14. The method according to claim 7, wherein the control code is generated by the field device based on at least one random number.

15. The method according to claim 7, wherein:
    the field device includes a control component that generates the control code; and
    the control component has a higher safety standard than at least one other component of the field device.

* * * * *